Figure 1:
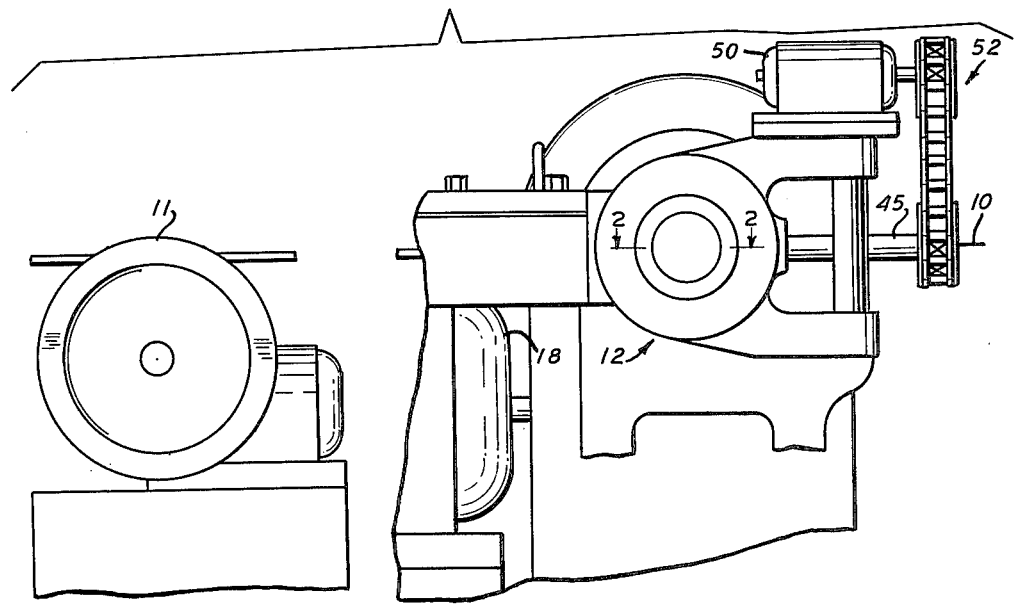

April 10, 1956     G. E. HENNING     2,740,988

EXTRUDING APPARATUS

Filed Dec. 28, 1951

INVENTOR
G. E. HENNING
BY [signature]
ATTORNEY

United States Patent Office 2,740,988
Patented Apr. 10, 1956

2,740,988

EXTRUDING APPARATUS

George E. Henning, Baltimore, Md., assignor to Western Electric Company, Incorporated, New York, N. Y., a corporation of New York Application December 28, 1951, Serial No. 263,751

2 Claims. (Cl. 18—13)

This invention relates to extruding apparatus, and more particularly to apparatus for extruding a covering on conductors or other cores.

In producing extruded coverings on conductors, serious difficulties have been encountered in maintaining the covering concentric with the conductor. One of the principal causes of eccentricity is the presence of unbalanced flow conditions in the extruding head employed to form the covering. The problem becomes particularly acute when an extruder having a transverse head is employed.

The extruding head in a typical transverse head extruder is generally provided with an extrusion passage that communicates with and extends transversely across the exit end of an extrusion cylinder, in which a stock screw is positioned. Extrudable plastic material is forced by the stock screw into the extrusion passage in the extruding head. A core guide is located at one end of the transverse extrusion passage, and a conductor to be insulated is advanced through a central opening in the core guide and into the passage at a point closely adjacent to a forming die located at the other end of the passage. The core guide is provided with a deflector, which directs the extrudable material toward the die.

A core tube projects from the exit end of the core guide and closely surrounds the advancing conductor. The core tube is designed to guide the conductor so that it passes through the center of the die. The extrudable material envelops the conductor in the space between the die and the exit end of the core tube and is formed into a tubular covering upon the conductor.

It has been determined that the point of minimum clearance between the core tube and the forming die is a critical point and that in order to produce a concentrically covered conductor, it is essential that the flow of material across the cross section of the extrusion passage at this critical point be balanced in quantity. The problem of maintaining this balanced flow condition at the critical point of extrusion is complicated by the fact that, in the type of extruding apparatus previously described, there is an abrupt change in the direction of flow of the material between the stock screw and the critical point. Due to this 90° band, the length of the path traversed by the material flowing through that portion of the cross section of the extrusion passage closest to the stock screw is substantially shorter than that traversed by the material flowing through the opposite portion thereof, which is furthest from the screw. Also, the flow of the material through the portion of the cross section of the passage closest to the stock screw approximates that of a fluid flow bounded by one plate, whereas in the other portion of the cross section the flow approximates that of a fluid flow between two parallel plates, hence the friction losses in the portion closest to the screw are appreciably lower than elsewhere in the passage.

As a result of the difference in the lengths of the paths traversed by the material in various portions of the extrusion passage and the characteristics of their associated flows, there exists a substantial difference in the pressure heads at the critical point of extrusion, the portion of the cross section of the passage nearest the stock screw having the highest value of pressure head. This unbalance of pressure heads and resultant unbalance of flows through the cross section of the extrusion passage at the critical point causes eccentricity in the covering extruded on the conductor, the thinnest portion of the eccentric covering occurring in that part of the insulation produced in the portion of the passage cross section furthest from the stock screw (i. e. where the lowest pressure head exists).

Various methods and apparatus have been devised in an attempt to obtain balanced flow conditions at the critical point of extrusion. However, these previous attempts to solve the problem have proved unsatisfactory or unnecessarily complicated.

It is an object of this invention to provide a new and improved extruding apparatus.

Another object is to provide a new and improved apparatus for extruding a covering on conductors or other cores.

Other objects and features of this invention will become more apparent as the specification proceeds.

An extruding apparatus illustrating certain features of this invention may include an extruding head having a longitudinally extending extrusion passage therein and a forming die positioned in one end of the extrusion passage. A core tube, provided with flutes and having a central bore through which a conductor may be advanced toward the forming die, is rotatably mounted within the extrusion passage, one end of the core tube being adjacent to the die so as to form an annular passage therebetween. Means are provided for rotating the fluted core tube so as to deliver extrudable material at substantially balanced flow conditions to the annular passage between the die and the end of the core tube.

Figure 2:
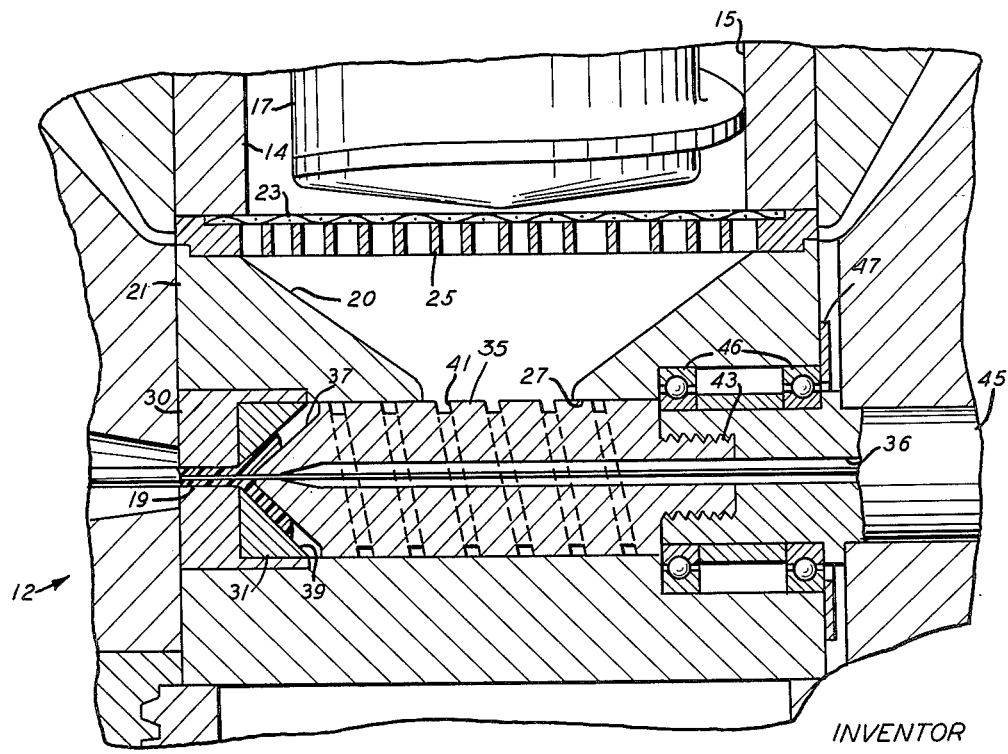

A clear understanding of the invention will be had from the following detailed description and the accompanying drawings, in which:

Fig. 1 is a fragmentary side elevation of an extruding apparatus embodying the invention, and Fig. 2 is a fragmentary horizontal section taken along the line 2—2 of Fig. 1.

In the extruding apparatus illustrated in Fig. 1 of the drawings, a conductor 10 is advanced by rotating capstans, one of which designated 11 is shown, through an extruding head shown generally at 12. The extruding head 12 is designed to apply a covering upon the advancing conductor.

The details of the extruding head 12 are shown more fully in Fig. 2. A cylinder 14, having a cylindrical bore 15 formed therein, is provided with a rotatably mounted stock screw 17. The screw 17 is operatively connected to a motor 18 for the purpose of forcing plastic material 19 through a tapered opening 20 in a body member 21. A screen 23, positioned across the exit end of the bore 15 is supported by a backing plate 25. The backing plate 25 is provided with a plurality of spaced apertures which allow the passage of plastic material therethrough. The screen 23 prevents any foreign matter and coagulated material from passing into the tapered opening 20.

The body member 21 is further provided with an extrusion passage 27, which is positioned transversely with respect to the bore 15 and communicates with the tapered opening 20. The exit end of the extrusion passage 27 is recessed to receive a cylindrical die holder 30, which is firmly secured therein by adjacent members of the extruding head 12. The die holder 30 serves to retain and position a forming die 31 in place within the exit end of the passage 27. A centrally located aperture formed in the die holder 30 provides an exit for the advancing conductor 10.

A rotatable, cylindrical core tube 35 is positioned within the extrusion passage 27 and is provided with a longitudinally extending bore 36 through which the conductor 10 may be advanced. The end of the core tube 35 adjacent to the forming die 31 is provided with a frustroconical tip 37, which cooperates with a frustroconical opening 39 in the die 31 to form an annular extrusion passage therebetween. The bore 36 in the core tube is reduced in diameter at this end, so as to engage the advancing conductor 10 closely and direct it accurately through the center of the opening in the forming die 31.

The central portion of the core tube 35 has a helical groove 41 formed in the periphery thereof. The groove 41 extends from a point near the entrance end of the tube 35 until it communicates with the annular passage between the tip 37 and the surface of the opening 39 in the die 31. A threaded projection 43 at the right-hand end of the core tube 35 provides a connection for a hollow drive shaft 45, which extends partially into the passage 27 and is rotatably supported therein by roller bearings 46—46. A retaining ring 47 is provided to hold the bearings within a recessed portion of the body member 20. The drive shaft 45 is rotated by means of an electric motor 50 (Fig. 1) operatively connected to the shaft 45 through a sprocket and chain drive system designated 52.

*Operation*

In the extruder, the conductor 10 is advanced at a constant speed and under a constant tension, through the hollow shaft 45 and the core tube 35, to the forming die 31 where a covering of plastic material 19 is caused to envelope the conductor.

The plastic material 19 is forced by the stock screw 17 through the tapered opening 20 and into the extrusion passage 27. The material is carried toward the exit end of the extrusion passage 27 by the "impeller action" of the helical groove 41 on the rotating core tube 35, which is driven by the electric motor 50. The material is discharged from the groove 41 into the annular passage between the tip 37 and the surface of the opening 39 in the die 31. When the core tube 35 is rotating at optimum speed, the material flow in this region is distributed evenly about the cross section of the extrusion passage 27 at every point, so that the flow of material at the critical point of extrusion is substantially balanced throughout. In addition, the rotating core tube 35 tends to equalize the temperature gradient around the periphery of the opening 39 in the die 31 by virtue of the rotation. The rotating core tube 35 does not permit a heat head to build up in any one section of the extrusion passage 27, thereby promoting a more uniform viscosity throughout the body of material 19 within the passage.

The material 19 envelopes the advancing conductor 10 in the throat of the forming die and the circular opening thereof produces a covering upon the conductor which is circular in cross section. Since the flow of material is substantially balanced, the resulting covering possesses a high degree of concentricity with respect to the conductor 10.

It will be understood that this apparatus may be used with both thermoplastic and vulcanizable compounds.

It is manifest that various modifications of the heretofore described embodiment may be made within the spirit and scope of this invention.

What is claimed is:

1. In an extruding apparatus for applying a concentric, continuous covering of an extrudable plastic material to a continuously advancing filamentary core including an extrusion cylinder having a bore formed therein, a stock screw rotatably mounted within the bore for advancing plastic material therealong, an extrusion head mounted at the exit end of the cylinder and provided with an extrusion passage formed therein which communicates with and extends transversely across the exit end of the bore formed in the cylinder and a stationary extrusion die positioned at the exit end of the extrusion passage and having a centrally located, tapered aperture therein, the improvement which comprises a cylindrical core tube mounted rotatably within the extrusion passage and having a longitudinally extending central bore through which a filamentary core may be advanced toward the tapered aperture in the die and a tapered nose adjacent and complementary to said tapered aperture, said core tube being provided with a helical groove formed in its outer periphery communicating at one end with the bore in the extrusion cylinder and at its other end with the tapered aperture in the die, and means for rotating the core tube continuously at a uniform speed to cause said helical groove to convey plastic material supplied by the stock screw to the tapered aperture in the die and to distribute it uniformly throughout the cross section of said aperture under substantially equal pressure and flow conditions.

2. In an extruding apparatus for applying a concentric, continuous covering of an extrudable plastic material to a continuously advancing filamentary core including an extrusion cylinder having a bore formed therein, a stock screw rotatably mounted within the bore for advancing plastic material therealong, an extrusion head mounted at the exit end of the cylinder and provided with a cylindrical extrusion passage formed therein which communicates with and extends transversely across the exit end of the bore formed in the cylinder and a stationary extrusion die positioned at the exit end of the extrusion passage and having a centrally located, tapered aperture therein, the improvement which comprises a cylindrical, rotatably mounted core tube fitting closely within the extrusion passage and having a longitudinally extending central bore through which a filamentary core may be advanced toward the tapered aperture in the die and a tapered nose spaced adjacent and complementary to said tapered aperture, said core tube being provided with a helical groove formed in its outer periphery communicating at one end with the bore in the extrusion cylinder and at its other end with the tapered aperture in the die, and means for rotating the helically grooved core tube continuously at a uniform speed, whereby the helical groove in the core tube conveys plastic material supplied by the stock screw to the tapered aperture in the die and distributes it about the entire cross section of said aperture under substantially equal pressure and flow conditions.

References Cited in the file of this patent

UNITED STATES PATENTS

| 37,112 | Sault | Dec. 9, 1862 |
| 380,610 | Van Gestel | Apr. 3, 1888 |
| 1,689,312 | Williams | Oct. 30, 1928 |
| 2,465,482 | Rhodes | Mar. 29, 1949 |
| 2,566,846 | Martin | Sept. 4, 1951 |